(12) United States Patent
Katada

(10) Patent No.: US 6,947,763 B2
(45) Date of Patent: Sep. 20, 2005

(54) PORTABLE TELEPHONE HAVING AN EXTERNAL MEMORY UNIT CONNECTOR

(75) Inventor: Nobuyuki Katada, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 09/991,690

(22) Filed: Nov. 26, 2001

(65) Prior Publication Data

US 2002/0065105 A1 May 30, 2002

(30) Foreign Application Priority Data

Nov. 24, 2000 (JP) ........................................ 2000-357655

(51) Int. Cl.⁷ ........................ H04M 1/00; H04M 11/10; H04M 3/00
(52) U.S. Cl. ................ 455/550.1; 455/412.1; 455/418; 455/557
(58) Field of Search ................ 455/418–420, 455/3.06, 413, 414.1, 412.1, 414.4, 425, 457, 550.1, 556.1, 556.2, 557, 558; 379/67.1, 88.11; 345/169, 530, 531, 532, 536, 553, 690, 205

(56) References Cited

U.S. PATENT DOCUMENTS

| | | | | |
|---|---|---|---|---|
| 5,303,288 A | * | 4/1994 | Duffy et al. ................ 455/564 |
| 5,481,595 A | * | 1/1996 | Ohashi et al. ............. 379/88.27 |
| 5,687,216 A | * | 11/1997 | Svensson .................. 455/412.2 |
| 5,920,826 A | * | 7/1999 | Metso et al. ................. 455/557 |
| 6,259,449 B1 | * | 7/2001 | Saxena et al. .............. 345/853 |
| 6,711,379 B1 | * | 3/2004 | Owa et al. .................. 455/3.01 |

FOREIGN PATENT DOCUMENTS

| | | | |
|---|---|---|---|
| EP | 0 378 775 A2 | 7/1990 | |
| EP | 0 622 933 A1 | 11/1994 | |
| JP | A 10-155033 | 6/1998 | |
| JP | 10155033 A | * 6/1998 | .......... H04M/11/00 |
| JP | 11-284758 | 10/1999 | |
| JP | 11-296548 | 10/1999 | |
| JP | A 2000-32169 | 1/2000 | |
| WO | 98/54846 | 12/1998 | |

* cited by examiner

*Primary Examiner*—William Trost
*Assistant Examiner*—Meless Zewdu
(74) *Attorney, Agent, or Firm*—Young & Thompson

(57) ABSTRACT

A portable telephone has a readable and writable internal memory unit, a readable, writable, and detachable external memory unit, a connecting unit for connecting the external memory unit to the main body of the portable telephone, and a control unit. The control unit can memorize information such as a mail in either one of the internal memory unit and the external memory unit, transfer information memorized in either one of the internal memory unit and the external memory unit to the other, and display an information memory territory for each piece of information, when the external memory unit is connected to the connecting unit.

9 Claims, 5 Drawing Sheets

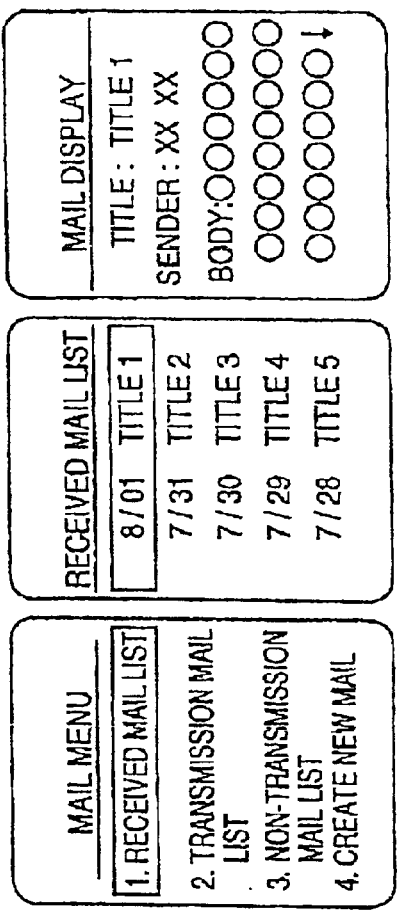
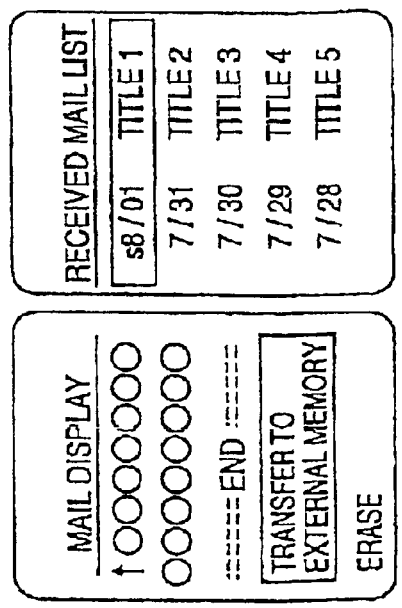
FIG. 2A  FIG. 2B  FIG. 2C
FIG. 2D  FIG. 2E

FIG. 3A

MAIL MENU
1. RECEIVED MAIL LIST
2. TRANSMISSION MAIL LIST
3. NON-TRANSMISSION MAIL LIST
4. CREATE NEW MAIL

FIG. 3B

RECEIVED MAIL LIST
8/01  TITLE 1
7/31  TITLE 2
7/30  TITLE 3
7/29  TITLE 4
7/28  TITLE 5

FIG. 3C

RECEIVED MAIL LIST
8/01  TITLE 1
7/31  TITLE 2
7/30  TITLE 3
7/29  TITLE 4
7/28  TITLE 5

FIG. 3D

RECEIVED MAIL LIST
7/25  TITLE 9
7/24  TITLE 10
==== END ====
TRANSFER TO EXTERNAL MEMORY
ERASE

FIG. 3E

RECEIVED MAIL LIST
s8/01  TITLE 1
7/31   TITLE 2
s7/30  TITLE 3
7/29   TITLE 4
7/28   TITLE 5

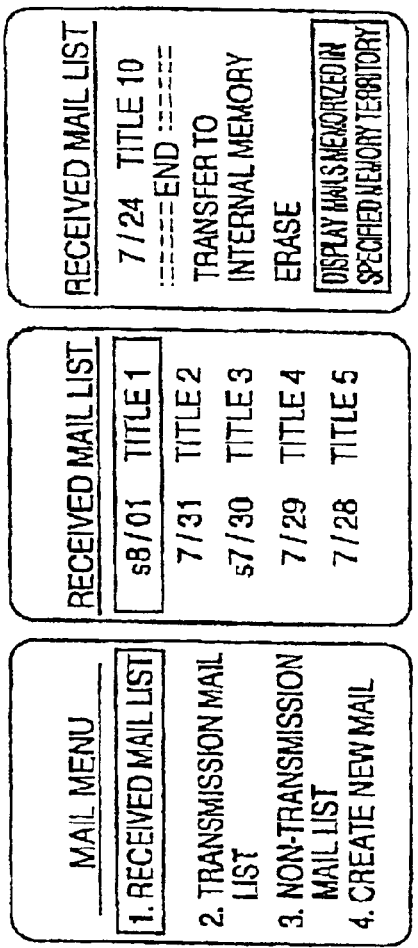
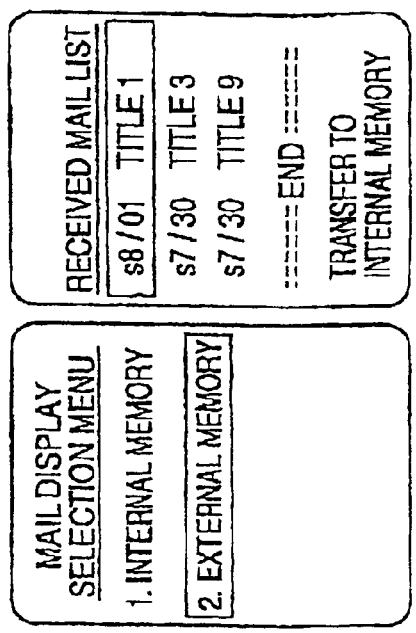

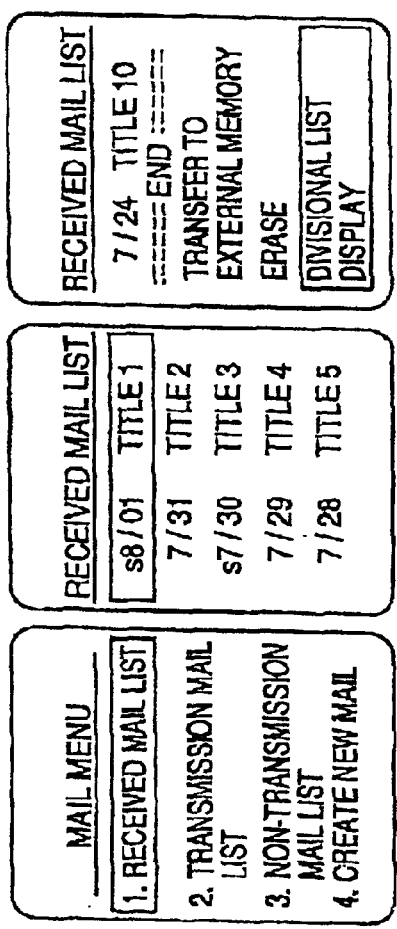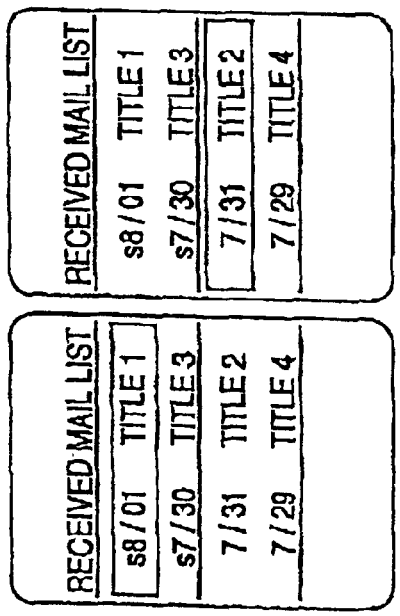

PORTABLE TELEPHONE HAVING AN EXTERNAL MEMORY UNIT CONNECTOR

BACKGROUND OF THE INVENTION

The present invention relates to a portable telephone and, particularly, to a portable telephone having an external memory unit connector and hence capable of connecting to an external detachable memory unit via the connecting unit.

Recently, portable telephones have spread that enable not only speech communication but also text mail communication. As for the text mail communication, received mails, transmission mails, etc. are memorized in a readable and writable memory unit that is mounted on an internal printed circuit board of a portable telephone together with data such as received dates and sender information. When a user wants to display information of a mail or the like on a display means, he performs predetermined manipulations on a manipulation means, whereupon sender information etc. of the mail or the like is displayed.

If a user wants to keep a received mail, he can keep it forever in the portable telephone by designating it as a mail to be kept. Portable telephones of the type concerned have a function of displaying a list of dates, senders (receivers), titles and the like, when a user want refer to reception transmission mails.

A portable telephone with a memory card is disclosed in Japanese Patent Laid-Open No. 2000-32169 as a portable telephone having a detachable memory unit.

In this portable telephone with a memory card, a user can check the contents of a conversation later by mounting a detachable memory card in the portable telephone and recording, in the memory card, what the user and the counterpart say during the conversation using the portable telephone. With this function, even if the user switches portable telephones, he need not do re-registration work if he makes switching to a proper memory card.

However, it is expected that in the future employment of color display means and provision of high-speed communication services will increase mails having a relatively large data amount such as mails containing a photograph or a moving picture whereas text-only mails will also be exchanged. In such a situation, a heavier load will be imposed on the memory unit for memorizing transmitted or received mail information and the number of pieces of information that can be memorized will becomes very small.

Large-capacity memory unit are physically voluminous and expensive. Portable telephones incorporating a large-capacity memory unit are expensive to users who mainly exchange text mails though they are acceptable to users who send and receive mails having a large amount of information.

Conversely, for users who frequently send and receive mails containing such data as a moving picture, a portable telephone incorporating a small-capacity memory unit is difficult to use because the memory unit becomes full of information in a short time.

Where a portable telephone enables use of only a non-detachable memory unit, the only method for transferring data of a photograph, a moving picture, or the like to another electronic device is to perform data communication via a cable. This is inconvenient; that is, this takes time and is cumbersome.

The technique of the publication No. 2000-32169 is merely intended to memorize what the user and the counterpart say during a conversation using a portable telephone and later check the contents of the conversation, as well as to dispense with telephone number re-registration work by switching memory cards in switching portable telephones used. The portable telephone disclosed in this publication is not valuable to both kinds of users who send and receive mails having a large amount of data and users who mainly exchange text mails.

SUMMARY OF THE INVENTION

An object of the present invention is to provide a portable telephone having an external memory unit connector that can solve the above problems in the art.

To attain the above object, the invention provides a portable telephone having an external memory unit connector. The portable telephone comprises external memory unit that is readable and writable; connector for connecting the external memory unit to the portable telephone; internal memory unit that is readable and writable and is mounted on an internal printed circuit board; and control unit. The control unit controls so as to memorize a mail in ether one of the internal memory unit and the external memory unit, and so as to transfer a mail memorized in ether one of the internal memory unit and the external memory unit to the other, and so as to display an information memory territory for each mail in displaying a mail list on display means.

More specifically, the invention provides the following portable telephones.

A portable telephone comprises internal memory unit that is readable and writable and is contained inside the portable telephone; external memory unit that is readable, writable, and detachable; connector for connecting the external memory unit to a main body of the portable telephone; and control unit. The control unit controls so as to memorize information in ether one of the internal memory unit and the external memory unit, and so as to transfer information memorized in ether one of the internal memory unit and the external memory unit to the other, and so as to display an information memory territory for each piece of information, when the external memory unit is connected to the connector.

A portable telephone having an external memory unit connector. The portable telephone comprises internal memory unit that is readable and writable and is contained inside the portable telephone; external memory unit that is readable, writable, and detachable; connector for connecting the external memory unit to a main body of the portable telephone; and control unit. The control unit so as to memorize information in ether one of the internal memory unit and the external memory unit, transferring information memorized in ether one of the internal memory unit and the external memory unit to the other, and so as to display an information memory territory for each piece of information, and so as to change a memory territory of one piece of information whose detailed contents are displayed on display means by causing a user to perform a predetermined manipulation, when the external memory unit is connected to the connector.

A portable telephone having an external memory unit connector. The portable telephone comprises internal memory unit that is readable and writable and is contained inside the portable telephone; external memory unit that is readable, writable, and detachable; connector for connecting the external memory unit to a main body of the portable telephone; and control unit. The control unit controls so as to memorize information in one of the internal memory unit and the external memory unit, and so as to transfer information memorized in either one of the internal memory unit and the external memory unit to the other, and so as to display an information memory territory for each piece of information by using different colors for the internal memory unit and the external memory unit, when the external memory unit is connected to the connector.

A portable telephone having an external memory unit connector. The portable telephone comprises internal memory unit that is readable and writable and is contained inside the portable telephone; external memory unit that is readable, writable, and detachable; connector for connecting the external memory unit to a main body of the portable telephone; and control unit. The control unit controls so as to memorize information in one of the internal memory unit and the external memory unit, and so as to transfer information memorized in ether one of the internal memory unit and the external memory unit to the other, and so as to display an information memory territory for each piece of information, and so as to display on display means, only information memorized in ether one of the internal memory unit and the external memory unit, when the external memory unit is connected to the connector.

A portable telephone having an external memory unit connector. The portable telephone comprises internal memory unit that is readable and writable and is contained inside the portable telephone; external memory unit that is readable, writable, and detachable; connector for connecting the external memory unit to a main body of the portable telephone; and control unit. The control unit controls so as to memorize information in ether one of the internal memory unit and the external memory unit, and so as to transfer information memorized in ether one of the internal memory unit and the external memory unit to the other, and so as to display an information memory territory for each piece of information, and separately displaying information memorized in the internal memory unit and information memorized in the external memory unit in two divisional parts of a displayable area of display means, when the external memory unit is connected to the connector.

BRIEF DESCRIPTION OF THE DRAWINGS

FIGS. 2A–2E show pictures that appear in the case where a mail body is displayed and then the mail is transferred to an external memory unit in a portable telephone according to one embodiment of the invention;

FIGS. 3A–3E show pictures that appear in the case where a received mail list is displayed and then a selected mail is transferred to the external memory unit in the portable telephone according to the one embodiment of the invention;

FIGS. 4A–4E show pictures that appear in the case where a received mail list is displayed and then display of received mails memorized in a specified memory territory is selected in a portable telephone according to another embodiment of the invention; and FIGS. 5A–5E show pictures that appear in the case where a received mail list is displayed and where then received mails memorized in two memory units is separately displaying by dividing the screen of a display unit into two parts is selected in a portable telephone.

DESCRIPTION OF THE PREFERRED EMBODIMENTS

Figure 1:
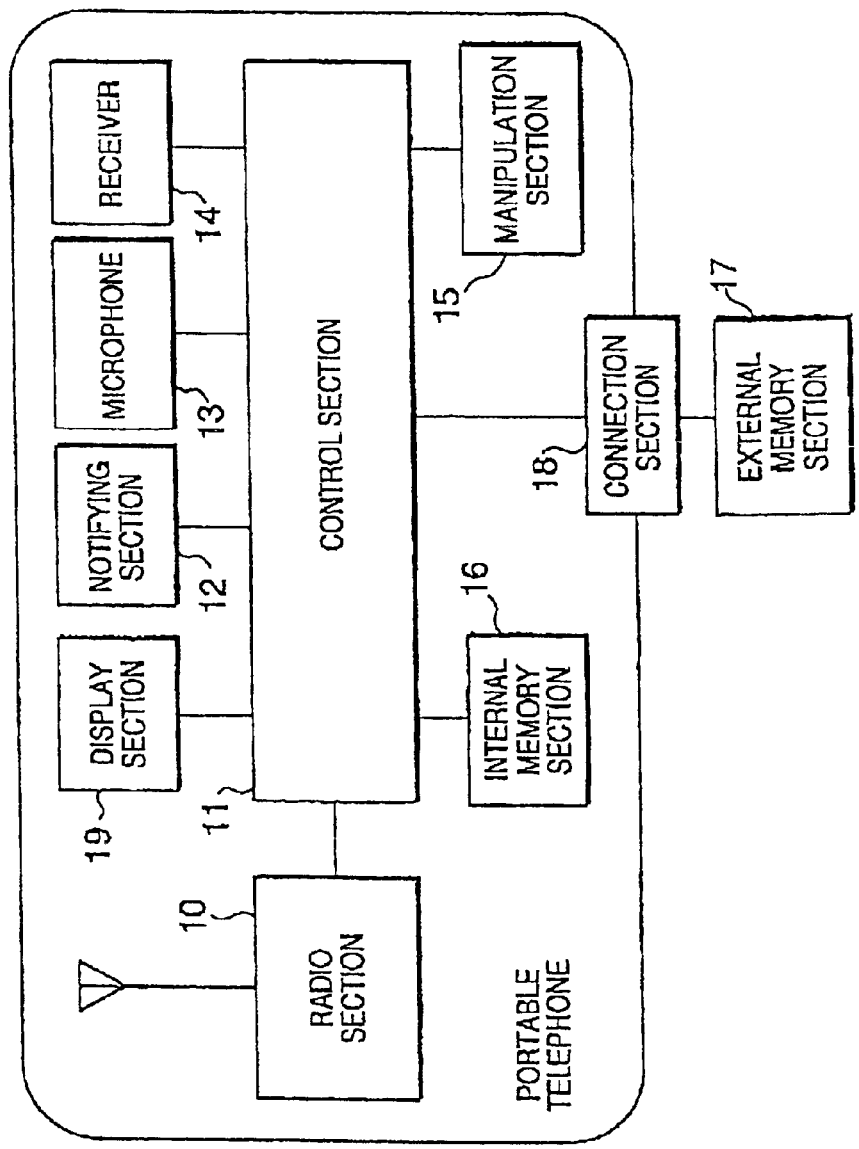
FIG. 1 is a block diagram showing a portable telephone according to one embodiment of the present invention.

Preferred embodiments of the present invention will be hereinafter described in detail with reference to the accompanying drawings.

FIG. 1 is a block diagram showing a portable telephone according to an embodiment of the invention.

As shown in FIG. 1, the portable telephone according to the embodiment has a radio unit 10 for receiving and transmitting, a control unit 11 for controlling the processing of the entire device, a notifying unit 12 for notifying the user of call arrival, a microphone 13 and a receiver 14 for performing speech communication when the user responds to a termination call, a manipulation unit 15 to be manipulated by the user, an internal memory unit 16 and an external memory unit 17 for memorizing received information etc., and a connecting unit 18 as a means for connecting the external memory unit 17 to the portable telephone. Reference numeral 19 denotes a display unit.

This embodiment is characterized in that the following two functions are added to the control unit 11. The first function enables the user to transfer information memorized in one of the internal memory unit 16 and the external memory unit 17 to the other by manipulating the manipulation unit 15. The second function is such that when information is displayed on the display unit 19 (display means), a memory territory (memory unit; the internal memory unit 16 or the external memory unit 17) where each piece of information is memorized is also displayed.

Next, the operation of the above portable telephone will be described.

FIGS. 2A–2E show examples of items that are caused to be displayed on the display unit 19 by the control unit 11 when information is transferred from one of the internal memory unit 16 and the external memory unit 17 to the other in the above portable telephone.

For example, assume that the portable telephone has received 10 mails and all of them have been memorized in the internal memory unit 16 automatically. When a key on the manipulation unit 15 that is assigned to display of a predetermined mail menu is depressed in a state that no manipulation or speech is being performed with the portable telephone, the mail menu is displayed as shown in FIG. 2A. The user selects a mail category such as received mails, transmission mails, or non-transmission mails.

If "Received mail list" is selected by moving the cursor (the characters are hatched (or inverted), however, encircled by a simple solid line in the figure for a purpose of clarifying the illustration) and depressing the decision key, a received mail list is displayed as shown in FIG. 2B.

In general, the display means of portable telephones are much smaller than those of notebook-sized personal computers etc. Therefore, the display method of a received mail list is restricted to a manner that a received date and a title, each of which consists of several characters, of each received mail are displayed.

Then, the user selects a mail whose contents he wants to check. For example, if the user wants to display a mail having a title "Title-1," he moves the cursor to the row of the intended mail (the characters are hatched (or inverted), however, encircled by a simple solid line in the figure for a purpose of clarifying the illustration) and depresses the decision key, whereupon the title, sender, and body of the selected mail are displayed on the display unit 19 as shown in FIG. 2C.

If not all of the mail body cannot be displayed as one page on the display unit 19, the user can scroll the page line by line or page by page by performing predetermined manipulations on the manipulation unit 15.

A mail processing menu follows the mail body as shown in FIG. 2D. If the displayed mail is no longer necessary, the user selects "Erase," whereupon all the information relating to the displayed mail is erased from the internal memory unit 16.

If the user selects transfer to the external memory unit 17, all the information relating to the displayed mail is transferred to the external memory unit 17 which is a readable, writable, and detachable memory unit. When a received mail list is displayed again, a character "s" is shown at the head of the row of the transferred mail as shown in FIG. 2E.

A mail for which the character "s" is shown is a mail that is memorized in the external memory unit 17, and a mail for which the character "s" is not shown is a mail that is memorized in the internal memory unit 16. It goes without saying that characters or symbols may be assigned to the two respective kinds of mails. If information or data need not be erased or transferred, the user performs predetermined manipulations on the manipulation unit 15, whereupon a received mail list is displayed. Where the mail processing menu that is displayed after the mail body includes, in addition to "Erase" and "Transfer to external memory," an item "Return to received mail list," a received mail list can also be displayed by selecting this item.

Although the above description is directed to the case of transferring a mail from the internal memory unit 16 which is the memory unit incorporated inside the portable telephone to the external memory unit 17 which is a readable, writable, and detachable memory unit, a mail can be transferred in the opposite way by a similar method.

The example of FIGS. 2A–2E is directed to the transfer method that is used in a state that the body of an individual mail is displayed. FIGS. 3A–3E show examples of items that are displayed on the display unit 19 when a mail is transferred in a state that a received mail list is displayed. The pictures of FIGS. 3A and 3B that appear in displaying a received mail list are the same as those of FIGS. 2A and 2B.

When the user selects a mail to be transferred by performing predetermined manipulations on the manipulation unit 15, the selected mail (in this example, title-3) is underlined as shown in FIG. 3C. That is, the underline indicates that the corresponding mail has been selected. The user can select a plurality of mails if he wants to do so. After completing the selecting manipulations, the user selects one kind of processing from a processing menu that follows the received mail list, whereupon the selected mail is processed.

If "Erase" is selected, all of the selected mails are erased. If "Transfer to external memory" is selected as shown in FIG. 3D, all information of the selected mail is transferred to the external memory unit 17 which is a readable, writable, and detachable memory unit. When a received mail list is displayed again automatically, a character "s" is shown at the head of the row of the transferred mail as shown in FIG. 3E.

Mail transfer is completed in the above-described manner. If there are more than 100 received mails and a mail to be erased, transferred, or otherwise processed is located approximately at the center of a received mail list, cumbersome manipulations are needed to use the processing menu to be displayed after the received mail list. To cope with this case, it is possible to provide a function of jumping to the processing menu by performing prescribed manipulations after completing selecting manipulations.

Memory territories where respective mails are memorized are discriminated from each other by showing a character, a symbol, or the like for each mail. In portable telephones capable of color display, memory territories where respective mails are memorized can be discriminated from each other by using different colors for the respective memory territories. In this case, no character or the like is displayed for the purpose of discrimination between the memory territories and hence the number of characters to be used for display of a date, a title, etc. can be increased as much.

FIGS. 4A–4E show examples of items that are displayed on the display unit 19 of a portable telephone according to another embodiment of the invention in which the control unit 11 enables display of a list of mails that are memorized in one of the internal memory unit 16 and the external memory unit 17. A received mail list is displayed in the same manner as described above.

When the user wants to display a list of mails that are memorized in one of the internal memory unit 16 and the external memory unit 17 in a state that a received mail list is displayed, he selects a menu item "Display of mails memorized in specified memory territory" (the characters are actually hatched (or inverted), however, encircled by a simple solid line in the figure for a purpose of clarifying the illustration) from a processing menu that follows the received mail list as shown in FIG. 4C. Upon the selection of this menu item, a mail display selection menu is displayed as shown in FIG. 4D. Then, the user selects one of the internal memory unit 16 and the external memory unit 17 the mails memorized in which he wants to have displayed.

If the external memory unit 17 is selected, a received mail list is displayed on the display unit 19 in which a character "s" indicating that the corresponding mail is memorized in the external memory unit 17 is shown at the head of the row of every mail displayed (see FIG. 4E).

If the internal memory unit 16 is selected from the mail display selection menu, a list of received mails memorized in the internal memory unit 16 is displayed. In this list, the character "s" is not shown at the head of any row.

The portable telephone may be configured in such a manner that the processing menu that follows a list of mails memorized in the internal memory unit 16 or the external memory unit 17 includes a menu item for allowing the user to transfer a mail to the other memory unit, and that if this menu item is selected the mail can be transferred. Naturally, this operation is controlled by the control unit 11.

FIGS. 5A–5B show examples of items that are displayed on the display unit 19 of a portable telephone according to still another embodiment of the invention in which the control unit 11 has a control function of separately displaying a list of mails memorized the internal memory unit 16 and a list of mails memorized in the external memory unit 17 by dividing the screen of the display unit 19. A received mail list is displayed in the same manner as described above.

A mail processing menu that follows a mail list includes an item "Divisional list display." If the user selects the menu item "Divisional list display" by performing predetermined manipulations on the manipulation unit 15 (the characters are actually hatched (or inverted), however, encircled by a simple solid line in the figure for a purpose of clarifying the illustration) as shown in FIG. 5C, the control unit 11 displays a list of received mails memorized the internal memory unit 16 and a list of received mails memorized in the external memory unit 17 by dividing the screen into two parts that are arranged in the vertical direction.

In this embodiment, as shown in FIGS. 5D and 5E, the list of received mails memorized the internal memory unit 16 and the list of received mails memorized in the external memory unit 17 in the top part and the bottom part of the screen, respectively.

If in browsing the mail lists the user wants to search the list of received mails memorized in the internal memory unit 16 though the received mail of title-1 that is memorized in the external memory unit 16 is currently selected as shown in FIG. 5D, he moves the cursor by performing predetermined manipulations on the manipulation unit 15 so as to select a received mail memorized in the internal memory unit 16. This allows the user to search a desired received mail list freely.

Although each of the above embodiments is directed to the case of handling the information of received mails, it goes without saying that the information of transmission mails or the like can be handled by performing similar manipulations.

The invention provides the following advantages.

The user can select a memory unit having a capacity that is suitable for him. When the amount of information to be memorized increases, the user may simply change the external memory unit to the one having a larger capacity so as to correspond to the increased amount of information. This brings about enhanced ease of use to the user.

Since the external memory unit is detachable, information can easily be transferred to another electronic device.

What is claimed is:

1. A portable telephone comprising:
   internal memory unit that is readable and writable and is contained inside the portable telephone;
   external memory unit that is readable, writable, and detachable;
   connector for connecting the external memory unit to a main body of the portable telephone;
   a display unit; and
   control unit connected so as to have access to both the internal and external memory units, the control unit being structured so as to be able to store one or more distinct information sets in either one of the internal memory unit and the external memory unit, the control unit also being structured so as to allow a first of either one of the internal memory unit and the external memory unit to transfer one or more of the distinct information sets stored in the first to the other, the control unit also being connected to the display unit so as to simultaneously display a plurality of unique identifiers, each corresponding to one of the distinct information sets;
   wherein the control unit controls the display unit so that a first indicia is displayed only with each unique identifier that corresponds to an information set that is stored in the external memory unit, when the external memory unit is connected to the connector.

2. The portable telephone as claimed in claim 1, wherein: each of the internal memory unit and the external memory unit is constructed and arranged so as to be able to store text data, sound data, and image data that the portable telephone has transmitted or received.

3. The portable telephone as claimed in claim 1, wherein: each of the internal memory unit and the external memory unit is constructed and arranged so as to be able to store text data, sound data, and image data that the portable telephone has transmitted or received.

4. The portable telephone of claim 1, wherein the control unit controls the display unit so that a second indicia is displayed only with each unique identifier that corresponds to an information set that is stored in the internal memory unit, when the external memory unit is connected to the connector, the second indicia being different from the first indicia.

5. A portable telephone comprising:
   internal memory unit that is readable and writable and is contained inside the portable telephone;
   external memory unit that is readable, writable, and detachable;
   connector for connecting the external memory unit to a main body of the portable telephone;
   a display unit; and
   control unit connected so as to have access to both the internal and external memory units, the control unit being structured so as to be able to store one or more distinct information sets in either one of the internal memory unit and the external memory unit, the control unit also being structured so as to allow a first of either one of the internal memory unit and the external memory unit to transfer one or more of the distinct information sets stored in the first to the other, the control unit also being connected to the display unit so as to simultaneously display a plurality of unique identifiers, each corresponding to one of the distinct information sets;
   wherein the control unit controls the display unit such that each unique identifier corresponding to one of the information sets is displayed by using one color for identifiers corresponding to information set stored in the internal memory unit and a different color for identifiers corresponding to information set stored in the external memory unit, when the external memory unit is connected to the connector.

6. The portable telephone as claimed in claim 5, wherein: each of the internal memory unit and the external memory unit is constructed and arranged so as to be able to store text data, sound data, and image data that the portable telephone has transmitted or received.

7. The portable telephone as claimed in claim 5, wherein: each of the internal memory unit and the external memory unit is constructed and arranged so as to be able to store text data, sound data, and image data that the portable telephone has transmitted or received.

8. A portable telephone comprising:
   internal memory unit that is readable and writable and is contained inside the portable telephone;
   external memory unit that is readable, writable, and detachable;
   connector for connecting the external memory unit to a main body of the portable telephone;
   a display unit; and
   control unit connected so as to have access to both the internal and external memory units, the control, unit being structured so as to be able to store one or more distinct information sets in either one of the internal memory unit and the external memory unit, the control unit also being structured so as to allow a first of either one of the internal memory unit and the external memory unit to transfer one or more of the distinct information sets stored in the first to the other, the control unit also being connected to the display unit so as to simultaneously display a plurality of unique identifiers, each corresponding to one of the distinct information sets;
   wherein the control unit controls the display unit so as to separately display those unique identifiers that correspond to information sets stored in the internal memory unit and those unique identifiers that correspond to information sets stored in the external memory unit in two divisional parts of a displayable area of the display unit, respectively, when the external memory unit is connected to the connector.

9. A portable telephone comprising:

an internal memory unit that is readable and writable and is contained inside the portable telephone;

an external memory unit that is readable, writable, and detachable;

a connector for connecting the external memory unit to a main body of the portable telephone;

a display unit; and a control unit connected so as to have access to both the internal and external memory units, the control unit being structured so as to be able to store one or more distinct information sets in either one of the internal memory unit and the external memory unit, the control unit also being structured so as to allow a first of either one of the internal memory unit and the external memory unit to transfer one or more of the distinct information sets stored in the first to the other, the control unit also being connected to the display unit so as to simultaneously display a plurality of unique identifiers, each corresponding to one of the distinct information sets;

wherein the control unit controls the display unit so that a first indicia is displayed only with each unique identifier that corresponds to an information set that is stored in the internal memory unit, when the external memory unit is connected to the connector.

* * * * *